(12) United States Patent
Wilson et al.

(10) Patent No.: US 12,432,430 B2
(45) Date of Patent: Sep. 30, 2025

(54) WATERPROOF THERMAL CAMERA ENCLOSURE

(71) Applicant: The United States of America, as represented by the Secretary of the Navy, Crane, IN (US)

(72) Inventors: Samuel Douglass Wilson, Bloomington, IN (US); Matthew David Alley, Bloomington, IN (US); Matthew Edward Cummings, Bedford, IN (US)

( * ) Notice: Subject to any disclaimer, the term of this patent is extended or adjusted under 35 U.S.C. 154(b) by 310 days.

(21) Appl. No.: 18/112,551

(22) Filed: Feb. 22, 2023

(65) Prior Publication Data

US 2024/0280881 A1 Aug. 22, 2024

(51) Int. Cl.
*H04N 23/23* (2023.01)
*H04N 23/51* (2023.01)

(52) U.S. Cl.
CPC .............. *H04N 23/23* (2023.01); *H04N 23/51* (2023.01)

(58) Field of Classification Search
CPC ......... H04N 23/23; H04N 23/51; G03B 17/08
See application file for complete search history.

(56) References Cited

U.S. PATENT DOCUMENTS

| 11,115,569 B1* | 9/2021 | Myers | H04N 23/55 |
| 2019/0293898 A1* | 9/2019 | Hasegawa | H04N 23/51 |

\* cited by examiner

*Primary Examiner* — Nicholas G Giles
(74) *Attorney, Agent, or Firm* — Naval Surface Warfare Center, Crane Division; Christopher Feigenbutz (57) ABSTRACT

Provided is a weatherproof enclosure for an electro-optic infrared camera core with male lens threads and exposed electronics. The enclosure includes a lens cover with female threads, a front and rear main body, a first and second gasket, a cable gland opening in the rear main body, and mounting holes. The female threads attach to the male threads to secure the lens cover to the front main body. The gaskets create a weatherproof seal, and the cable gland opening enables power and data cabling to pass to the exterior of the enclosure. The mounting holes permit attachment to a variety of surfaces. An alternative internal compression bracket can be used to secure a variety of OEM camera modules that all utilize the same bolt pattern. The enclosure provides superior protection from water intrusion and impact forces, permitting camera use in austere environments.

14 Claims, 7 Drawing Sheets

WATERPROOF THERMAL CAMERA ENCLOSURE

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 211378) is assigned to the United States Government and is available for licensing for commercial purposes. Licensing and technical inquiries may be directed to the Technology Transfer Office, Naval Surface Warfare Center Crane, email: Crane_T2@navy.mil.

FIELD OF THE INVENTION

The field of invention relates generally to imaging devices. More particularly, it pertains to a weatherproof enclosure for an imaging device.

BACKGROUND

An electro-optic infrared (EOIR) imaging capability was needed for a developmental unmanned surface vessel (USV). An example is an OEM EOIR core from FLIR, such as the TAU 2 FLIR camera or the BOSON FLIR camera. These are bare cameras with exposed electronics, and are not suitable for use in the environments that a USV would be exposed to. An enclosures suitable for protecting the cameras from the environment were desirable. The ideal enclosure should be water tight, ruggedized, and would not interfere with the performance of the camera, such as with glass or plastic blocking the view of the aperture, which may interfere with proper imaging. In addition the enclosure needed to be lightweight, low profile, and able to be adapted to a mounting point on the USV hull. As shown from the above, there is a need for a new and improved weatherproof enclosure for EOIR core cameras.

SUMMARY OF THE INVENTION

Disclosed is a weatherproof enclosure for an electro-optic infrared camera core with male lens threads and exposed electronics. The enclosure includes a lens cover with female threads, a front and rear main body, a first and second gasket, a cable gland opening in the rear main body, and mounting holes. The female threads attach to the male threads to secure the lens cover to the front main body. The gaskets create a weatherproof seal, and the cable gland opening enables power and data cabling to pass to the exterior of the enclosure. The mounting holes permit attachment to a variety of surfaces. An alternative internal compression bracket can be used to secure a variety of OEM camera modules that all utilize the same bolt pattern. The enclosure provides superior protection from water intrusion and impact forces, permitting camera use in austere environments.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Generally, provided is a weatherproof enclosure for an electro-optic infrared camera core with male lens threads and exposed electronics comprising: a lens cover comprising female threads; a first gasket; a front main body; a rear main body; a second gasket; a cable gland opening in said rear main body; and mounting holes; wherein said female threads threadably attach to said male threads to secure said lens cover to said front main body; wherein said first gasket is positioned between said lens cover and said front main body to create a first weatherproof seal; wherein said front main body is secured to said rear main body; wherein said second gasket is positioned between said front and rear main body to create a second weatherproof seal; and wherein said cable gland opening creates a third weatherproof seal that enables power and data cabling from said exposed electronics to pass to the exterior of said weatherproof enclosure.

In an illustrative embodiment, said first gasket is an O-ring. In an illustrative embodiment, said enclosure further comprises apertures for attaching mounting plates thereto. In an illustrative embodiment, said apertures are threaded. In an illustrative embodiment, said front main body houses said camera and said rear main body houses power and data cabling for said camera. In an illustrative embodiment, said cable gland opening allows the power and data cabling to attach to said camera, to pass from said camera through said rear main body and out of said enclosure. In an illustrative embodiment, said front main body further comprises an internal shelf, internal shelf apertures, and an internal compression bracket. In an illustrative embodiment, said internal compression bracket is positioned behind said camera and is secured in place via threaded bolts that secure to said internal shelf apertures. In an illustrative embodiment, said internal compression bracket is flush with said front main body portion allowing for attachment of said second gasket and said rear main body.

In an illustrative embodiment, provided is a weatherproof enclosure for an electro-optic infrared camera core with male lens threads and exposed electronics comprising: a lens cover comprising female threads; a first gasket; a front main body; a rear main body; a second gasket; a cable gland opening in said rear main body; and mounting holes; wherein said female threads threadably attach to said male threads to secure said lens cover to said front main body;

wherein said first gasket is positioned between said lens cover and said front main body to create a first weatherproof seal; wherein said front main body is secured to said rear main body; wherein said second gasket is positioned between said front and rear main body to create a second weatherproof seal; wherein said cable gland opening creates a third weatherproof seal that enables power and data cabling from said exposed electronics to pass to the exterior of said weatherproof enclosure; and wherein said front main body further comprises an internal shelf, internal shelf apertures, and an internal compression bracket.

Figure 1:
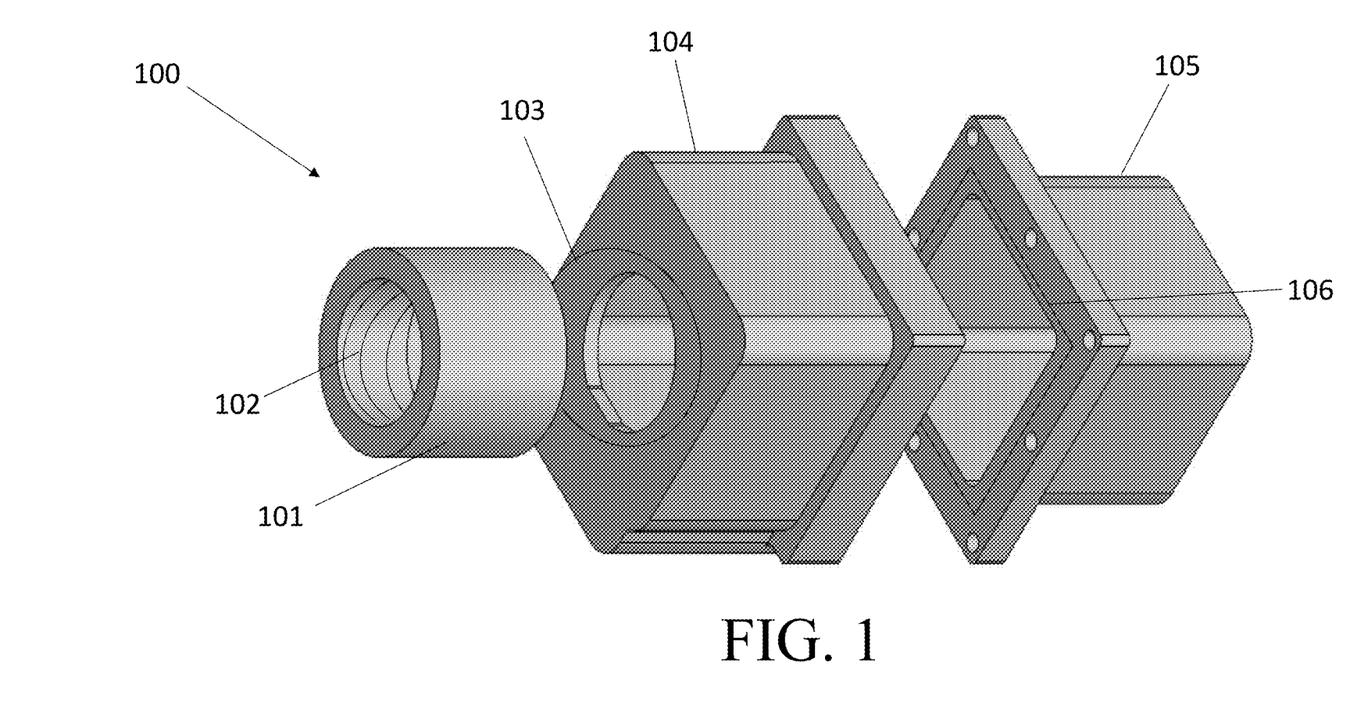
FIG. 1 shows an exploded view of the camera enclosure.
Figure 2:
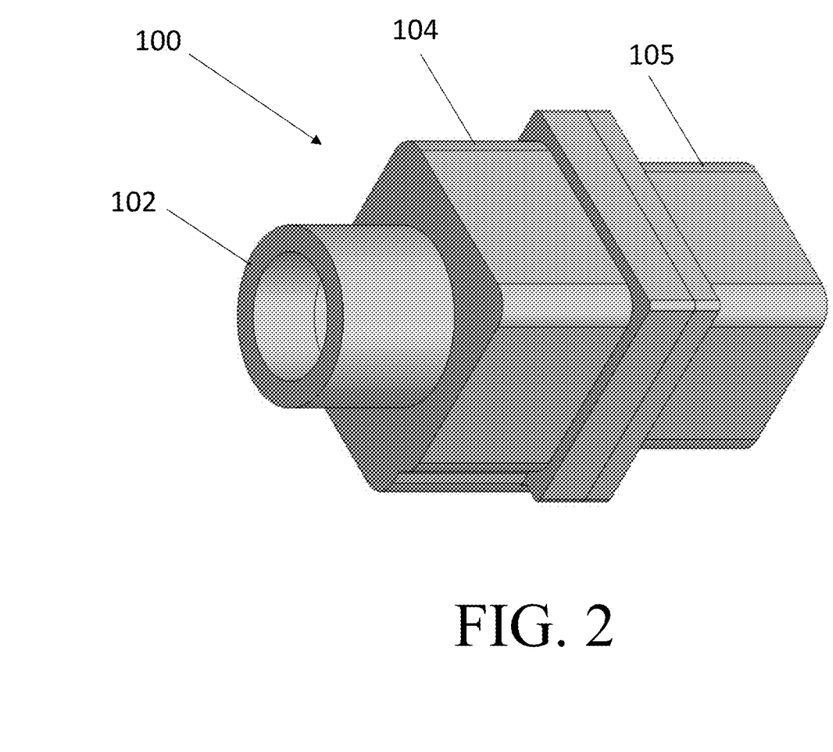
FIG. 2 shows a perspective view of the camera enclosure.

FIG. 1 shows an exploded view of the camera enclosure 100, and FIG. 2 shows a perspective view of the camera enclosure 100. The enclosure 100 includes a lens cover 101 comprising female threads 102, a first gasket 103, a front main body 104, a rear main body 105, a second gasket 106, a cable gland opening in the rear main body (not shown); and mounting holes (not shown). The female threads 102 threadably attach to male threads on the camera lens to secure the lens cover to the front main body, which will be shown in greater detail below.

The lens cover 101 comprising female threads 102 is designed to secure the camera core into the front and rear main body 104, 105. The female threads 102 provides clamping force to secure the camera core as well as to compress the first gasket 103. In an illustrative embodiment, the first gasket 102 is an O-ring designed to seal the camera body from liquid intrusions. The lens cover 101 also acts to shield the camera aperture from glare caused by direct sun or moon light by extending past the end of the camera body. The lens cover 101, however, does not extend far enough as to intrude into the cameras field of view.

Figures 3A, 3B:
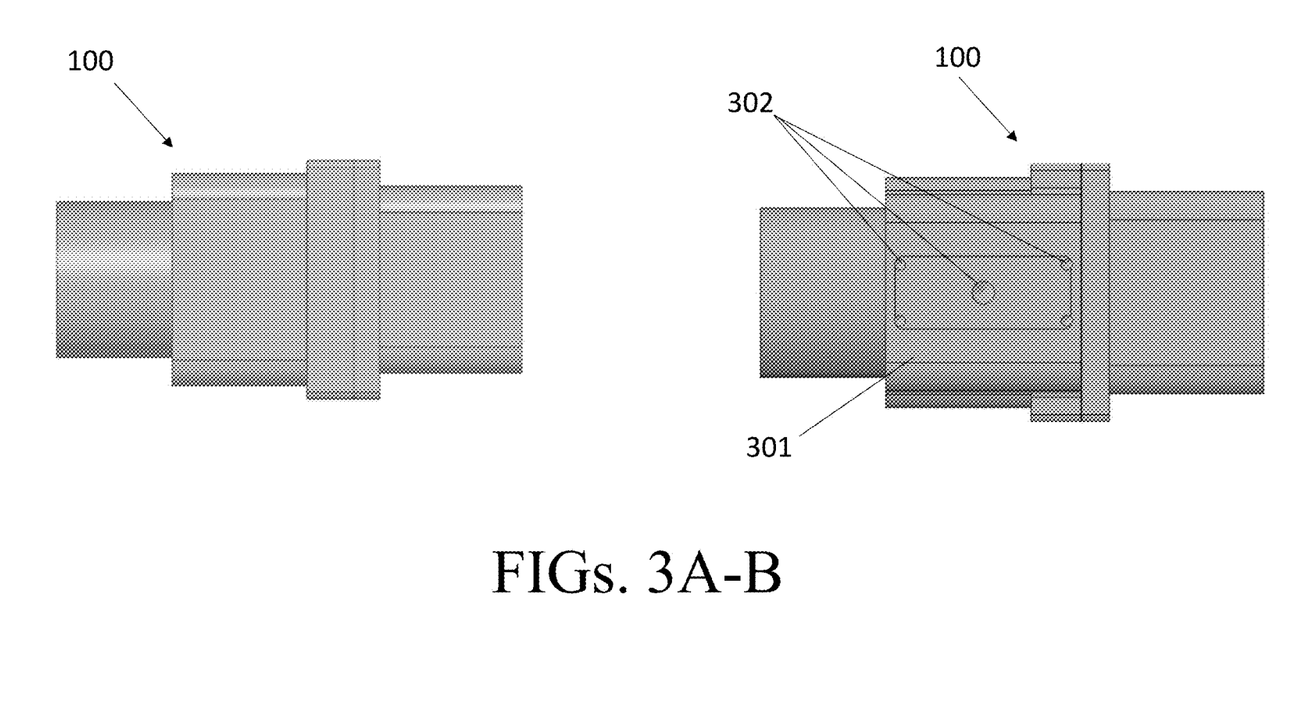
FIG. 3A shows a top view of the camera enclosure.
FIG. 3B shows a bottom view of the camera enclosure.

FIG. 3A shows a top view of the camera enclosure 100, and FIG. 3B shows a bottom view of the camera enclosure 100. In an illustrative embodiment, the base 301 of the enclosure 100 includes apertures 302 for attaching mounting plates thereto. The apertures 302 can be threaded to allow the enclosure 100 to be mounted to a variety of surfaces. The number, size, and configuration of the apertures 302 can be configured based on specific usage requirements for the enclosure 100 and camera. In an illustrative embodiment, the apertures 302 can be used for mounting an adapter to allow for attachment of a picatinny style rail.

Figure 4:
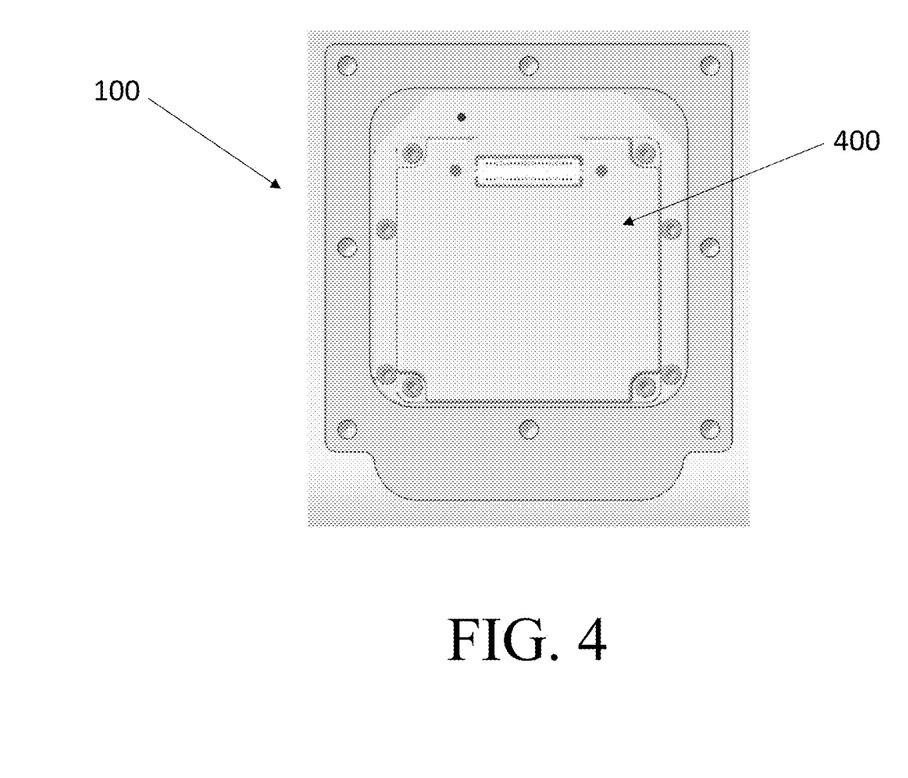
FIG. 4 shows a rear view of the camera enclosure with the camera installed.
Figure 5:
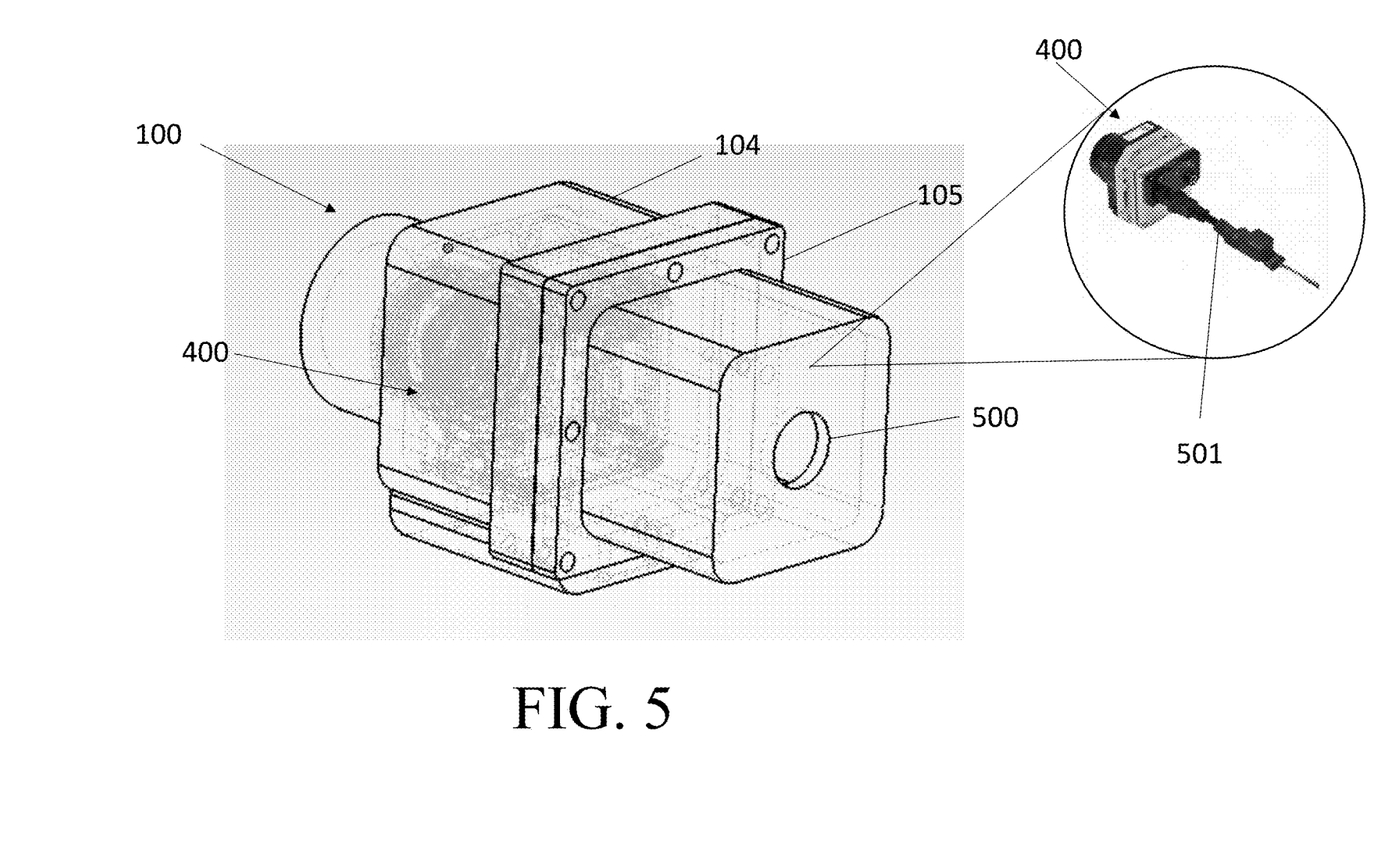
FIG. 5 shows a perspective view of the camera enclosure with the camera installed.

FIG. 4 shows a rear view of the camera enclosure 100 with the camera 400 installed, and FIG. 5 shows a perspective view of the camera enclosure 100 with the camera installed 400. In an illustrative embodiment, the front main body 104 portion houses the camera 400 and the rear main body 105 houses power and data cabling 501 for the camera 400. As can be appreciated, since the camera 400 substantially fits within the front main body 104 portion of the enclosure 100, there is sufficient room in the rear main body 105 for power and data cabling for the camera 400. The rear portion of the rear main body 105 includes a cable gland opening 500 to allow the installation of a conventional cable gland that is well understood in the art. As can be appreciated, the cable gland opening 500 allows the power and data cabling to attach to the camera 400, to pass from the camera 400 through the rear main body 105 and out of the enclosure 100, while preventing liquid intrusion.

Figure 6:
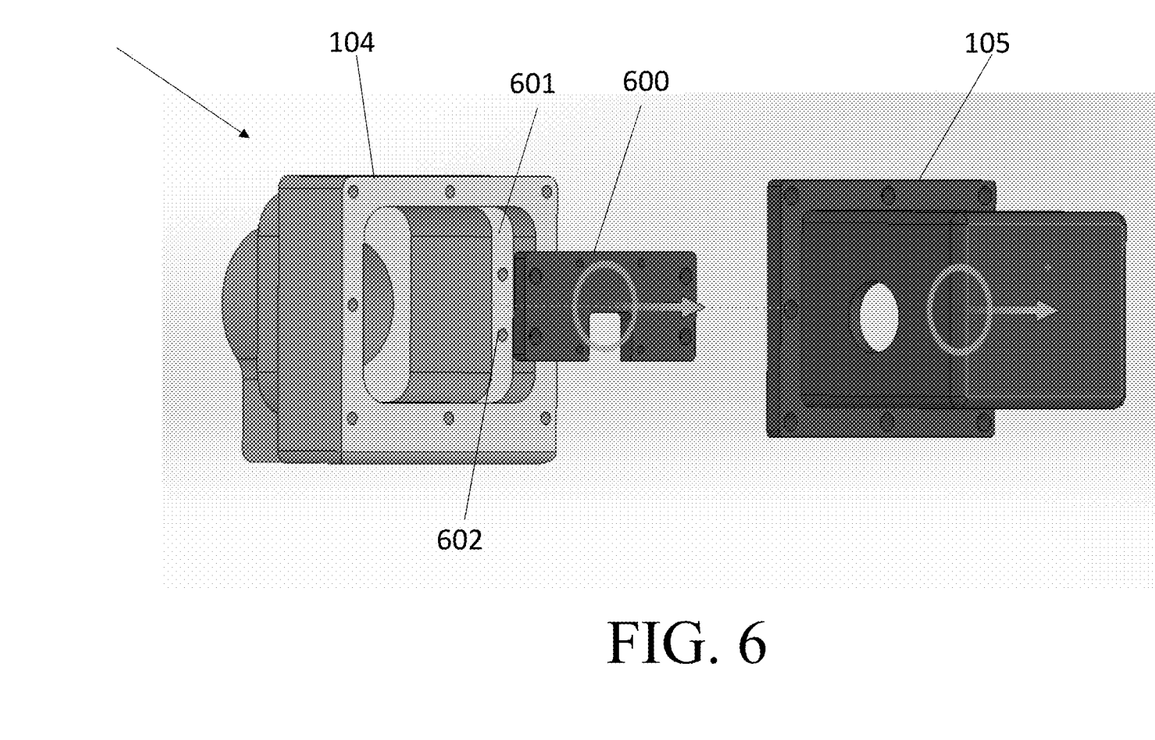
FIG. 6 shows an alternative mounting with an exploded an internal compression bracket.
Figure 7:
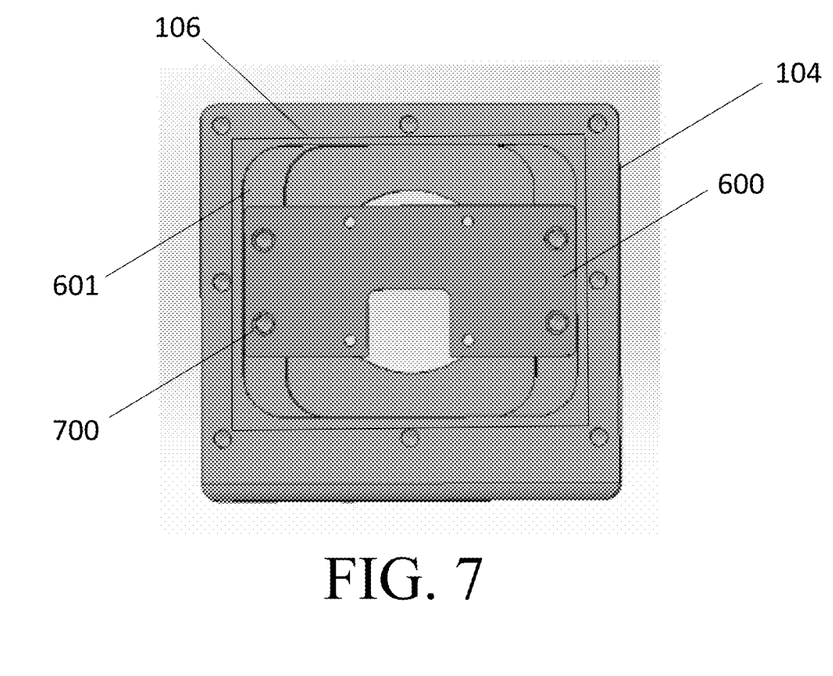
FIG. 7 shows an internal compression bracket installed in the front main body with the rear main body removed.

FIG. 6 shows an alternative mounting with an internal compression bracket 600, and FIG. 7 shows an internal compression bracket 600 installed in the front main body 104 with the rear main body 105 removed. In an alternate embodiment, mounting of the camera to the enclosure is accomplished with the inclusion of an internal compression bracket 600 and internal shelf apertures 601 inside of the front main body 104 portion. In an illustrative embodiment, the internal shelf apertures 601 comprise threaded hole for accepting bolts, screws, or the like. The internal shelf apertures 601 are located on an internal shelf 602 within the front main body 104 portion. In this embodiment, the camera 400 within the front main body 104 portion, (as best viewed in FIG. 5) is secured within the front main body 104 portion. The internal compression bracket 600 is positioned behind the camera and secured in place via threaded bolts 700. The internal bracket 600 sits flush with the back of the front main body 104 portion, allowing for attachment of the second gasket 106 and rear main body 105.

The internal compression bracket 600 functions to secure a variety of OEM camera modules that all utilize the same bolt pattern. The various OEM camera modules are secured by changing the bolt length used on the internal bracket 600. In an illustrative embodiment, variations of bolt pattern, threading, and grooving can occur on the bottom of the front main body 104 portion to accommodate different adapter plates.

In an illustrative embodiment, the enclosure allows for ruggedization of an electro-optic infrared camera core with male lens threads and exposed electronics. In an illustrative embodiment, the camera is a FLIR OEM camera module. When installed within the enclosure, the camera can be utilized in an austere environment, providing superior protection from water intrusion and impact forces. Additionally the mounting scheme allows for adaption of a mounting bracket allowing attachment to a wide range of surfaces in varying orientations.

In an illustrative embodiment, the enclosure can be adapted for use with various OEM modules by changing dimensions to accommodate the main camera body, and matching of the threading of the female threads on the lens cover to that of the OEM module. The enclosure will allow for use with multiple OEM modules in the same class with minimal or no alterations needed as well.

In an illustrative embodiment, the lens cover and female threads can accommodate IR transparent germanium lenses with the addition of an inset groove on the exterior face.

In an illustrative embodiment, the enclosure can be manufactured from a variety of different techniques including but not limited to traditional manufacturing, additive manufacturing, and injection molding. In an illustrative embodiment, the enclosure can be constructed of aluminum or a suitable polymer or metal. The enclosure can be used in any industry where a small and rugged enclosure is desired to protect and mount an EOIR camera including defense, technology, and entertainment industries.

Although the invention has been described in detail with reference to certain preferred embodiments, variations and modifications exist within the spirit and scope of the invention as described and defined in the following claims.

The invention claimed is:

1. A weatherproof enclosure for an electro-optic infrared camera core with male lens threads and exposed electronics comprising:
    a lens cover comprising female threads;
    a first gasket;
    a front main body;
    a rear main body;
    a second gasket;
    a cable gland opening in said rear main body; and
    mounting holes;
    wherein said female threads threadably attach to said male threads to secure said lens cover to said front main body;

wherein said first gasket is positioned between said lens cover and said front main body to create a first weatherproof seal;

wherein said front main body is secured to said rear main body;

wherein said second gasket is positioned between said front and rear main body to create a second weatherproof seal; and wherein said cable gland opening creates a third weatherproof seal that enables power and data cabling from said exposed electronics to pass to the exterior of said weatherproof enclosure.

2. The weatherproof enclosure of claim 1, wherein said first gasket is an O-ring.

3. The weatherproof enclosure of claim 1, wherein said enclosure further comprises apertures for attaching mounting plates thereto.

4. The weatherproof enclosure of claim 3, wherein said apertures are threaded.

5. The weatherproof enclosure of claim 1, wherein said front main body houses a camera and said rear main body houses power and data cabling for said camera.

6. The weatherproof enclosure of claim 1, wherein said cable gland opening allows the power and data cabling to attach to a camera, to pass from said camera through said rear main body and out of said enclosure.

7. The weatherproof enclosure of claim 1, wherein an internal compression bracket is positioned behind a camera and is secured in place via threaded bolts that secure to internal shelf apertures.

8. The weatherproof enclosure of claim 1, wherein an internal compression bracket is flush with said front main body portion allowing for attachment of said second gasket and said rear main body.

9. A weatherproof enclosure for an electro-optic infrared camera core with male lens threads and exposed electronics comprising:
- a lens cover comprising female threads;
- a first gasket;
- a front main body;
- a rear main body;
- a second gasket;
- a cable gland opening in said rear main body; and
- mounting holes;

wherein said female threads threadably attach to said male threads to secure said lens cover to said front main body;

wherein said first gasket is positioned between said lens cover and said front main body to create a first weatherproof seal;

wherein said front main body is secured to said rear main body;

wherein said second gasket is positioned between said front and rear main body to create a second weatherproof seal;

wherein said cable gland opening creates a third weatherproof seal that enables power and data cabling from said exposed electronics to pass to the exterior of said weatherproof enclosure; and wherein said front main body further comprises an internal shelf, internal shelf apertures, and an internal compression bracket.

10. The weatherproof enclosure of claim 9, wherein said first gasket is an O-ring.

11. The weatherproof enclosure of claim 9, wherein said enclosure further comprises apertures for attaching mounting plates thereto.

12. The weatherproof enclosure of claim 11, wherein said apertures are threaded.

13. The weatherproof enclosure of claim 9, wherein said front main body houses a camera and said rear main body houses power and data cabling for said camera.

14. The weatherproof enclosure of claim 9, wherein said cable gland opening allows the power and data cabling to attach to a camera, to pass from said camera through said rear main body and out of said enclosure.

* * * * *